L. W. POND.

Saw Swaging-Machine.

No. 6,322. Reissued March 9, 1875.

WITNESSES:
P. C. Dieterich
W. McArthur

INVENTOR:
Levi W. Pond
West & Bond
per
ATTORNEYS.

THE GRAPHIC CO. PHOTO-LITH. 39 & 41 PARK PLACE, N.Y.

UNITED STATES PATENT OFFICE.

LEVI W. POND, OF EAU CLAIRE, WISCONSIN, ASSIGNOR TO HIMSELF AND THE EAU CLAIRE LUMBER COMPANY, OF SAME PLACE.

IMPROVEMENT IN SAW-SWAGING MACHINES.

Specification forming part of Letters Patent No. 102,319, dated April 26, 1870; reissue No. 6,322, dated March 9, 1875; application filed February 13, 1875.

*To all whom it may concern:*

Be it known that I, LEVI W. POND, of Eau Claire, in the county of Eau Claire and State of Wisconsin, have invented certain new and useful Improvements in Machine for Swaging and Finishing Up Saws, of which the following is a full description, reference being had to the accompanying drawings, in which—

Figure 1:
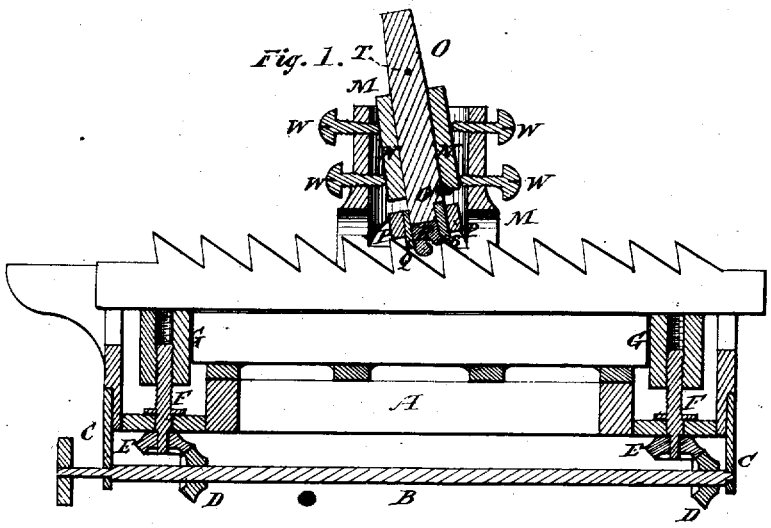
Figure 2:
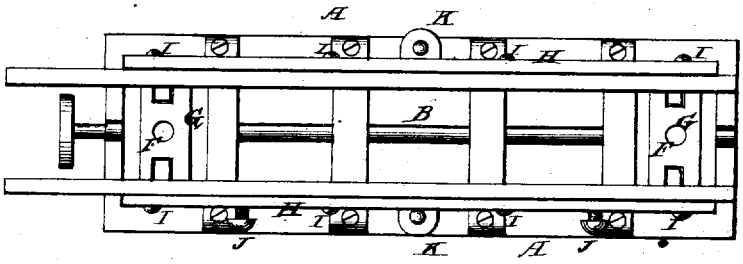
Figure 3:
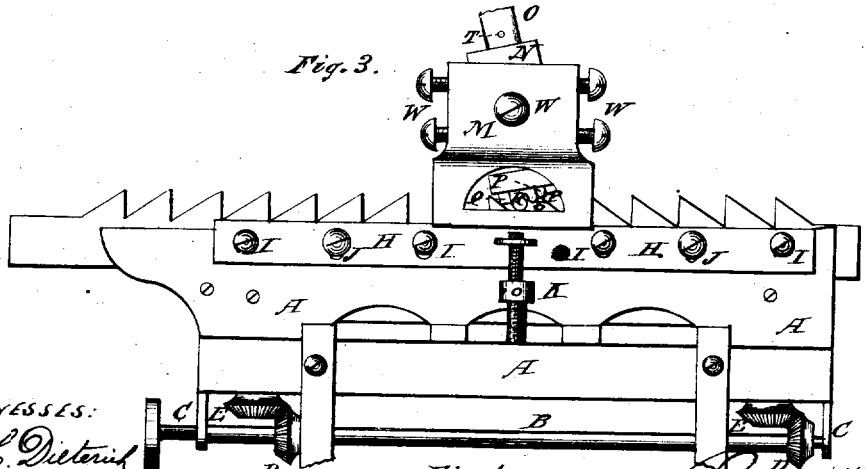
Figure 4:
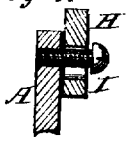

Figure 1 is a vertical longitudinal section of the machine, showing an ordinary straight saw. Fig. 2 is a plan view, with the saw and swaging devices removed; Fig. 3, a side view of the machine, showing in it a saw constructed so as to cut both down and up.

My invention relates to a machine to be used in swaging and finishing up or jointing the teeth of reciprocating saw-mill saws in common use. The invention can also be used for the same purposes with saws arranged to cut up and down.

In saw-mills it is important that the teeth of the saws be on a straight line; and in those mills using gang-saws the teeth of all of the saws of the gang ought to be on as nearly the same line as possible. A saw the teeth of which are on a perfectly-straight line when out of its gate has a tendency to spring out in the center when strained up in the gate. The extent of curvature depends on circumstances, and is found to vary from one-eighth to three-eighths of an inch, more or less.

So far as I know, until my invention no machine has been known by the use of which each saw can be accurately brought to a straight line when strained up, and all the saws of a gang be brought to the same straight line. I accomplish the desired result by means of a frame in which the saw is to be placed to be swaged or jointed, which frame has adjustable sides or ways, on which the instrument to be used is placed, so that, having ascertained the line of curvature which the saw has when strained up in the frame, the ways can be sprung to correspond therewith, and the saw can then be swaged or jointed on such a curved line that when strained in the gate the teeth will be brought to a straight line.

It is desirable to give the saws a certain overhang or rake when in the gate, and by the use of my machine I am able to do this accurately and uniformly by properly adjusting the saw upon the blocks on which it rests.

In the drawings, A is the frame of the machine. B is a shaft; C C, bearings for the shaft B; D D, bevel-gear wheels on the shaft B, which engage with similar wheels E E on the screws F F; G G, blocks on which the saw rests. These blocks can be raised or lowered by means of the screws F F. H H are ways, on which the swaging or jointing apparatus slides. These ways are beveled on the under side, from each end to the center, for the purpose hereinafter mentioned. I I are screws, which hold the ways in position. The holes in the ways through which the screws pass, except one at each end, are slotted vertically, to allow the ways to be sprung down or up at the center. J J are screws, which pass through the ways and sides of the machine, and come in contact with the pieces of wood placed by the sides of the saw, to hold the saw firmly in position. The holes in the ways through which these screws J pass are also slotted vertically. K is a screw, so constructed and arranged that by its use the ways can be sprung up or down, first having loosened the screws I J. In the drawing a swaging device only is represented. M is the carriage which carries this device; N, the stock in which the swage is held; O, the shank of the swage; P, the clasp to hold the swaging-blocks; R S, swaging-block, made of steel; Q, wedge which holds the block R S in place. These blocks are so arranged that the tooth can be properly swaged out between R S, and then the point of the tooth can be made hooking by the recess in R when forced down. The descent of the swage is limited by the pin T. The stock N is steadied by screws W.

In use, a straight line is to be drawn upon the saw-plate while it is strained up in the gate, as nearly as possible parallel with the line, or desired line, of the teeth. When the saw is removed from the gate this line will be curved downward somewhat at the center, more or less, according to circumstances. Having placed the saw loosely in the machine, resting on the blocks G, the ways H must be sprung by means of the screws K, so that the line of the ways will correspond with the line drawn on the saw, and then the ways and saw must be secured in that position. Then, as the device which is to be used in operating on the teeth passes over the ways or track, the line of the teeth may be a curved line after the operation; but if so, the saw will spring out at the center when again strained up, and the curved line will become a straight line, as it should be.

If the saw should be swaged or jointed before properly adjusting the ways, leaving them on a straight line, the line of the finished teeth might be straight when the saw is out of the gate, but curved when in the gate.

The foregoing instructions apply to saws which only cut with the down-stroke; but substantially the same method is applicable to saws which cut both down and up, by turning over the ways, bringing the beveled edges up, making the proper lines on the saw, and adjusting the ways thereto as before. Sometimes, though rarely, the lines of the teeth are the same when the saw is out of the gate as when in it. Such saws can be finished up in my machine.

What I claim as new is as follows:

1. In a machine for swaging saw-teeth, an adjustable and yielding track, combined with a movable carriage for supporting the swage or jointer, substantially as described.

2. The adjustable blocks G, in combination with the frame A and a yielding track, substantially as and for the purposes specified.

3. A saw-swage composed of the carriage M, stock N, clasp P, blocks Q, R, and S, pin T, and set-screw W, substantially as specified.

LEVI W. POND.

Witnesses:

JNO. D. PATTEN,
C. H. WATSON.